United States Patent [19]

Fukushima

[11] 4,453,059

[45] Jun. 5, 1984

[54] MOUNTING DEVICE FOR SWITCHES OR THE LIKE

[75] Inventor: Toshitsugu Fukushima, Tokyo, Japan

[73] Assignee: Sun Dengyosha Company, Limited, Tokyo, Japan

[21] Appl. No.: 396,483

[22] Filed: Jul. 8, 1982

[30] Foreign Application Priority Data

Feb. 3, 1982 [JP] Japan .......................... 57-13041[U]

[51] Int. Cl.³ .......................................... H01H 9/00
[52] U.S. Cl. ................................................ 200/296
[58] Field of Search ................. 200/296, 295, 294; 248/27.3, DIG. 11, 518, 558

[56] References Cited

U.S. PATENT DOCUMENTS

| Re. 27,365 | 5/1972 | Dessert | 200/294 |
| 1,851,384 | 3/1932 | Fitzgerald | 200/296 X |
| 2,375,891 | 5/1945 | Bolley | 200/295 X |
| 3,676,630 | 7/1972 | Dennison | 200/295 |
| 4,242,545 | 12/1980 | Schweitzer | 200/296 X |
| 4,268,735 | 5/1981 | Iwakiri | 200/314 |
| 4,354,078 | 10/1982 | Yoshimura | 200/296 X |

FOREIGN PATENT DOCUMENTS

| 1299909 | 6/1962 | France | 200/296 |
| 657145 | 10/1963 | Italy | 200/296 |
| 743734 | 1/1956 | United Kingdom | 200/296 |

*Primary Examiner*—John W. Shepperd
*Assistant Examiner*—Renee S. Kidorf
*Attorney, Agent, or Firm*—Wenderoth, Lind & Ponack

[57] ABSTRACT

A mounting device for switches wherein a cylindrical body used as a casing for switches has an outer peripheral surface, an upper portion of which is formed with an external thread portion for bringing a fastening body into engagement, and a lower portion of which is formed with a mounting portion for detachably mounting an elastic mounting member. Either the fastening body or the elastic mounting member is alternatively used whereby the cylindrical body is mounted on a panel plate by the fastening body or the elastic mounting member.

At least one of the elastic mounting members is provided with an anti-rotation member for preventing rotation of the cylindrical body with respect to the panel plate.

10 Claims, 10 Drawing Figures

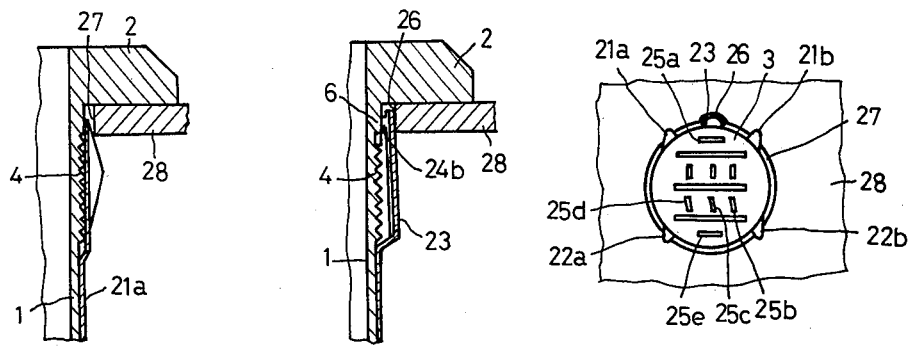
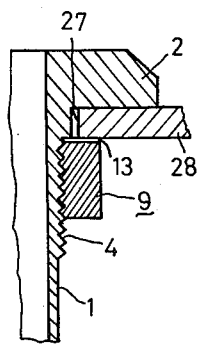
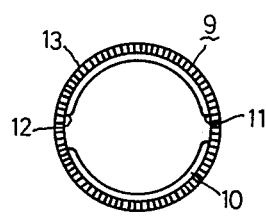
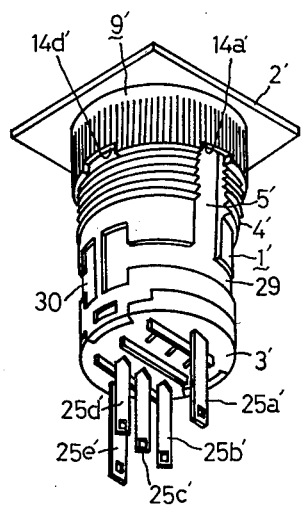
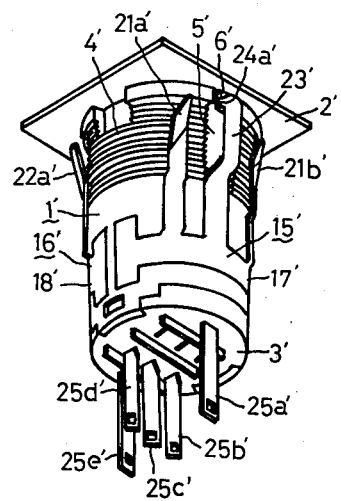

MOUNTING DEVICE FOR SWITCHES OR THE LIKE

BACKGROUND OF THE INVENTION

The present invention relates to a mounting device for mounting push-button switches and other switches or the like on a panel plate or the like. In general, a conventional mounting device of this type uses elastic elements as disclosed in U.S. Pat. No. 4,268,735. However, it is required, depending on the use, that a switch or the like is not mounted on the panel plate or the like with elastic elements but is instead mounted with screw threads. Thus, a mounting device which employs screw threads is required. However, it is inconvenient for both manufacturers and users to separately manufacture two kinds of mounting devices which are different in the mounting system. In this connection, it has been desired to develop a mounting device for a switch or the like, which can overcome such an inconvenience and can be used by suitably selecting one of the two systems.

SUMMARY OF THE INVENTION

It is an object of the present invention to provide a mounting device for switches or the like wherein in mounting a push-button switch or the like on a panel plate or the like, the user can suitably select, according to its use, one of mounting systems, one using screw threads and the other using elastic elements.

The present invention comprises a cylindrical body used as a casing for a switch or the like which has a switch mechanism or the like provided internally thereof and an engaging portion provided at the upper end thereof, an external thread portion formed only in the upper portion of the outer peripheral surface of the cylindrical body to threadedly engage a fastening body, a mounting portion for mounting an elastic mounting member, the mounting portion being provided on the outer peripheral surface of the cylindrical body so that the mounting portion is located below the external thread portion, a fastening body alternatively used with an internal thread portion threadedly engaged with the external thread portion, or an elastic mounting member detachably mounted on the mounting portion.

BRIEF DESCRIPTION OF THE DRAWINGS

FIG. 4 is an enlarged sectional view of a main portion of the cylindrical body of FIG. 1 mounted on a panel plate using an elastic mounting member in accordance with the invention;

FIG. 5 is an enlarged sectional view of other portions of the first embodiment of the invention in the state shown in FIG. 4;

FIG. 6 is a bottom view of the one embodiment of the invention in the state shown in FIGS. 4 and 5;

FIG. 7 is an enlarged sectional view of a main portion of the cylindrical body mounted on the panel plate using a fastening body in accordance with the invention;

FIG. 8 is a plan view of the fastening body;

FIG. 9 is a perspective view showing a fastening body mounted on a cylindrical body in a second embodiment of the invention; and FIG. 10 is a perspective view showing an elastic mounting member mounted on the cylindrical body of the second embodiment of the invention.

DETAILED DESCRIPTION OF THE INVENTION

Figure 1:
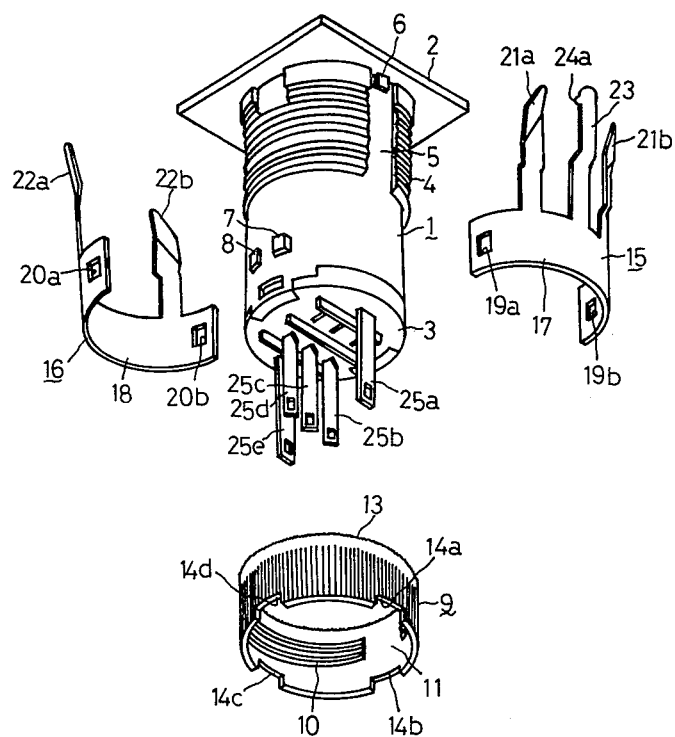
FIG. 1 is an exploded perspective view of a device as a whole showing a first embodiment of the present invention.
Figure 2:
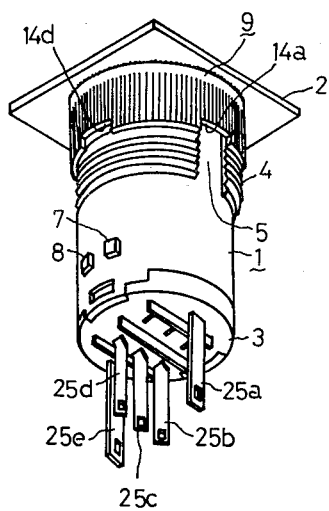
FIG. 2 is a perspective view of the fastening body mounted on the cylindrical body of FIG. 1.

As shown in FIG. 1, a cylindrical body 1 used as a casing for a switch, accommodating therein a switch mechanism (not shown) composed of a push-button, a microswitch and the like, has a flange portion 2 as an engaging portion provided at the upper end thereof and a bottom plate 3 fitted in and secured to the lower end thereof. The peripheral surface of the cylindrical body 1 has an external thread portion 4 formed in the upper portion thereof, and this external thread portion 4 has a notch portion 5 which extends in a longitudinal direction. A projection 6 is provided on the upper end of the notch portion 5. Two pairs of projections 7 and 8 (only one pair of the respective pairs being shown) which constitute a mounting portion are provided downwardly of the external thread portion 4 in the outer peripheral surface of the cylindrical body 1. Reference numeral 9 designates an annular fastening body formed in the inner peripheral surface thereof with an internal thread portion 10 threadedly engagable with the external thread portion 4, and this internal thread portion 10 is provided with notch portions 11 and 12 at two places capable of passing over the two pairs of projections 7 and 8 as clearly shown in FIG. 8. The fastening body 9 has rugged portions 13 formed in the upper end surface to positively maintain the fastened and fixed state, and has four notches 14a, 14b, 14c and 14d formed in an equally spaced relation in the lower end thereof with which a fastening tool engages (not shown). Reference numerals 15 and 16 designate a pair of elastic mounting members, which have circularly arched base portions 17 and 18 curved in the form of half circles respectively having pairs of mounting holes 19a, 19b and 20a, 20b so that they may be snug-fitted over the two pairs of projections 7 and 8, respectively. The elastic mounting members 15 and 16 are respectively provided with pairs of mounting elastic elements 21a, 21b and 22a, 22b extending upward from the respective base portions 17 and 18 and angled outwardly at their uppermost ends. The elastic mounting member 15 has an anti-rotation elastic element 23 provided at a position corresponding to the notch portion 5, in case the elastic mounting member 15 is snugly fit over the pair of projections 7. The upper end of the elastic element 23 is provided at the side thereof with a pair of holding portions 24a and 24b for holding the projection 6 (see FIG. 5). In FIG. 1, reference numerals 25a, 25b, 25c, 25d and 25e designate terminals for the switch mechanism accommodated within the cylindrical body 1.

In the following, a description will be made of, with reference to the mounting device in the above-mentioned embodiment, the case in which the cylindrical body 1 is mounted on a panel plate 28 bored with a circular hole 27 which is slightly larger in diameter than that of the cylindrical body 1 and having an enlarged portion 26 in a part thereof.

Figure 3:
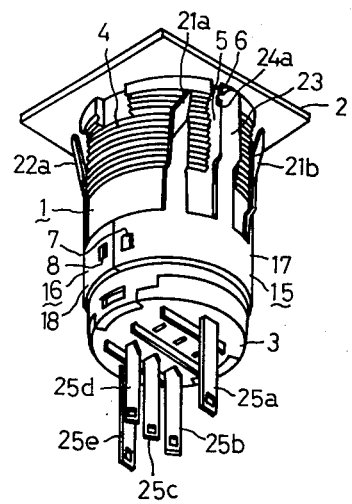
FIG. 3 is a perspective view of the elastic mounting member mounted on the cylindrical body of FIG. 1.

First, a description will be made of the case in which the elastic mounting members 15 and 16 are used. The mounting holes 19a, 19b of the elastic mounting member 15 are fitted over the pair of projections 7 of the cylindrical body 1 to secure the elastic mounting member 15 to the cylindrical body 1. Likewise, the mounting holes 20a, 20b of the elastic mounting member 16 are fitted over the pair of projections 8 to secure the elastic mounting member 16 to the cylindrical body 1. At this time, if the elastic element 23 is positioned opposite the notch portion 5 of the external thread portion 4 to urge the upper end of the elastic element 23 towards the notch portion 5, then the pair of holding elements 24a, 24b hold the projection 6. The state in which the respective elastic mounting members 15 and 16 are secured to the cylindrical body 1 is as shown in FIG. 3. Next, the cylindrical body 1 is inserted into the circular hole 27 of the panel plate 28 from the bottom with the elastic element 23 placed in correspondence to the enlarged portion 26 as illustrated in FIGS. 5-7. In this inserting, since each of the elastic elements 21a, 21b, 23, 22a, 22b has a resilient property, they will not be displaced towards the cylindrical body 1 to impair the inserting operation. When the cylindrical body 1 is inserted until the flange 2 engages the panel 28, the upper ends of the elastic elements 21a, 21b, 23, 22a and 22b come into resilient contact with and engagement with the peripheral edge portion of the circular hole 27. At this time, since the elastic element 23 causes the pair of holding elements 24a, 24b thereof to hold the projection 6 and is positioned within the enlarged portion 26, the cylindrical body 1 is fixed unrotatably relative to and unremovably from the panel plate 28. This fixed state may be released by urging the elastic elements 21a, 21b, 23, 22a and 22b towards the cylindrical body 1 against the spring forces thereof to release the engagement of the panel plate 28 with the peripheral edge of the circular hole 27 and pulling out the cylindrical body 1 from the circular hole 27.

If the spring forces of the elastic elements 21a, 21b, 22a and 22b are sufficiently strong, it is possible to impede the rotation of the cylindrical body 1 with respect to the panel plate 28 without provision of the elastic element 23. In this case, accordingly, the cylindrical body 1 need not be provided with the notch portion 5 and the projection 6, and the circular hole 27 of the panel plate 28 need not be provided with the enlarged portion 26. However, if each of the elastic elements 21a, 21b, 22a and 22b is strong in its spring force, when the cylindrical body 1 is inserted into the circular hole 27, the resistance increases to impair the smoothness of the inserting operation. If only the deterioration of spring forces resulting from the use for long periods is taken into consideration, the provision of the structure as in the aforementioned embodiment is desirable.

Next, a description will be made of the case in which the fastening body 9 is used. The cylindrical body 1 is inserted into the circular hole 27 of the panel plate 28 from the bottom until the flange 2 comes into engagement with the panel plate 28. Subsequently, the fastening body 9 is fitted over the cylindrical body 1 from the bottom with the notch portions 11 and 12 of the internal thread portion 10 positioned to correspond to the projections 7 and 8, respectively. Then, when the internal thread portion 10 of the fastening body 9 is brought into engagement with the external thread portion 4 of the cylindrical body 1 as shown in FIG. 7, the flange 2 and fastening body 9 assume the state in which the panel plate 28 is tightly held and the cylindrical body 1 is fixed unrotatably relative to and unremovably from the panel plate 28. This fixed state is positively maintained by the rugged portions 13 in the upper end surface of the fastening body 9. This fixed state may be released by releasing the engagement between the external thread portion 4 of the cylindrical body 1 and the internal thread portion 10 of the fastening body 9, correspondingly locating the notch portions 11 and 12 of the internal thread portion 10 with respect to the projections 7 and 8, respectively, to disengage the fastening body 9 from the cylindrical body 1, and pulling out the cylindrical body 1 from the circular hole 27.

Next, another embodiment of the present invention will be described with reference to FIGS. 9 and 10.

In this embodiment, the mounting portion comprises recessed portions 29 and 30 formed in correspondence to the shape of base portions 17' and 18' of elastic mounting members 15' and 16' which fit therein, in place of the projections 7 and 8 as in the aforementioned embodiment. Accordingly, a fastening body 9' used in this embodiment need not be provided with the notch portions 11 and 12 in the internal thread portion 10 disposed in the fastening body 9. Each of elastic elements 21a', 21b', 22a' and one not shown is in the form of a contour which slightly extends outwardly and horizontally and thereafter rises substantially vertically. Thus, when the base portions 17' and 18' are snugly fit in and secured to the recessed portions 29 and 30, the elastic elements 21a', 21b' and 22a' will not abut on the cylindrical body 1', thus achieving this operation smoothly. With respect to the elastic element 23', the notch portion 5' of the external thread portion 4' is extended up to the recessed portion 29 and the lower portion of elastic element 23 is fitted therein, thus not impairing the aforesaid fitting operation. Other structures and the fixing method to the panel plate are similar to those as described in connection with the previous embodiment and the description therefor is omitted.

The present invention is not limited to those embodiments as described above. For example, notch portions can be formed in the external thread portions 4 and 4' of the respective cylindrical bodies 1 and 1' so as to correspond to the elastic elements 21a, 21b, 22a, 22b and 21a', 21b', 22a' of the elastic mounting members 15 and 16, and 15' and 16', respectively, so that the elastic elements 21a, 21b, 22a, 22b and 21a', 21b', 22a' may be further forced towards the cylindrical bodies 1 and 1'. Furthermore, the elastic mounting members 15, 16 and 15', 16' and fastening bodies 9 and 9' may be variously modified in their structure.

As is apparent from the foregoing, the present invention can provide a mounting device for a switch or the like capable of alternatively using one of two fixing systems, one for a screwthread system and the other for an elastic element system. In addition, in the present invention, it is possible to reduce the manufacturing cost. Moreover, the present device is suitable for volume production and therefore, they may be provided at less cost.

What is claimed is:

1. An assembly for mounting a switch mechanism to a panel plate, comprising:
a cylindrical body for accomodating the switch mechanism therein, having an engaging portion at an upper end thereof for engaging the panel plate, said cylindrical body having an outer peripheral surface, said outer peripheral surface having a mounting portion formed therein; and
a pair of elastic mounting members mountable on said cylindrical body;

said pair of elastic mounting members each comprising a circularly curved base portion detachably mountable on said mounting portion on a respective opposite side of said cylindrical body and two elastic mounting pieces extending upward from said base portion and having respective upper portions angled radially outwardly for locking each mounting member and said cylindrical body onto the panel plate when said base portion is mounted on said mounting portion, at least one of said pair of elastic mounting members having an elastic anti-rotation member having an upper end which elastically engages said cylindrical body and blocks rotation of said pair of mounting members relative to said cylindrical body and the panel plate when the base portions thereof are mounted on said mounting portion on the respective opposite sides of said cylindrical body;

said cylindrical body including an upper projection projecting from said outer peripheral surface adjacent said upper end, said elastic anti-rotation member having means, at the top end thereof, for holding said upper projection.

2. An assembly as in claim 1, wherein said holding means comprises a pair of holding portions on the upper sides of said anti-rotation member engagable with opposite sides of said upper projection in the circumferential direction of said cylindrical body.

3. An assembly as in claim 1, wherein said outer peripheral surface has circumferentially extending external threads therein above said mounting portion adjacent said upper end.

4. An assembly as in claim 1, wherein said mounting portion includes two pairs of mounting projections, the base portions of each of said mounting members having mounting holes fittable over a corresponding one of said pairs of mounting projections so as to resiliently hold said mounting member on said cylindrical body, said fastening body having vertical planar grooves crossing said internal threads alignable with said pairs of mounting projections for sliding said grooves thereover for bringing said interior threads of said fastening body into engagement with said exterior threads of said cylindrical body.

5. An assembly as in claim 1, wherein said mounting portion comprises recesses in the shapes of the base portions of said mounting members so as to fittingly receive said base portions, said two elastic mounting pieces of each of said mounting members extending slightly outwardly so as to extend out of said recesses and then upwardly from said base portions.

6. An assembly for mounting a switch mechanism to a panel plate having an upper surface and a lower surface and a circular hole with a small enlarged hole portion in a part thereof, comprising:

a cylindrical body having an outer diameter slightly less than the diameter of the circular hole in the plate so as to be insertable therein, for accomodating the switch mechanism therein, having an engaging portion of width greater than the diameter of the circular hole at an upper end thereof for engaging the upper surface of the panel plate, said cylindrical body having an outer peripheral surface, said outer peripheral surface having a mounting portion formed therein, and a pair of elastic mounting members mountable on said cylindrical body;

said pair of elastic mounting members each comprising a circularly curved base portion detachably mountable on said mounting portion on a respective opposite side of said cylindrical body and two elastic mounting pieces extending upward from said base portion and having respective upper portions angled radially outwardly for engaging the lower surface of the panel plate and cooperating with said engaging portion to hold said cylindrical body to the panel plate with the panel plate held between the upper portions of said mounting pieces and said engaging portion when said base portion is mounted on said mounting portion, at least one of said pair of elastic mounting members having an elastic anti-rotation member having an upper end which elastically engages the panel plate in the small enlarged portion thereof to block rotation of said pair of mounting members and said cylindrical body when the base portions thereof are mounted on said mounting portion on the respective opposite sides of said cylindrical body;

said cylindrical body including an upper projection projecting from said outer peripheral surface adjacent said upper end, said elastic anti-rotation member having means, at the top end thereof, for holding said upper projection.

7. An assembly as in claim 6, wherein said holding means comprises a pair of holding portions on the upper sides of said anti-rotation member engagable with opposite sides of said upper projection in the circumferential direction of said cylindrical body.

8. An assembly as in claim 6, wherein said outer peripheral surface has external threads therein above said mounting portion adjacent said upper end.

9. An assembly as in claim 6, wherein said mounting portion includes two pairs of mounting projections, the base portions of each of said mounting members having mounting holes fittable over a corresponding one of said pairs of mounting projections so as to resiliently hold said mounting member on said cylindrical body, said fastening body having vertical planar grooves crossing said internal threads alignable with said pairs of mounting projections for sliding said grooves thereover the bringing said interior threads of said fastening body into engagement with said exterior threads of said cylindrical body.

10. An assembly as in claim 6, wherein said mounting portion comprises recesses in the shapes of the base portions of said mounting members so as to fittingly receive said base portions, said two elastic mounting pieces of each of said mounting members extending slightly outwardly so as to extend out of said recesses and then upwardly from said base portions.

* * * * *